3,157,464
PERCHLORATES OF TITANIUM AND BERYLLIUM
Roy J. Laran, Baton Rouge, La., assignor to Ethyl Corporation, New York, N.Y., a corporation of Virginia
No Drawing. Filed Feb. 26, 1962, Ser. No. 176,863
2 Claims. (Cl. 23—85)

Novel and useful chemicals, the perchlorates of Be and Ti (IV), are provided by this invention.

These are made by reacting anhydrous perchloric acid with an anhydrous halide of these metals. The reaction is conducted at low temperatures (e.g. −75 to 25° C.). The reaction system is essentially anhydrous throughout the reaction.

EXAMPLE I

*Anhydrous Titanium Tetraperchlorate*

Contact was established between excess anhydrous perchloric acid [see J. Am. Chem. Soc. 75, 184 (1953)] and titanium tetrachloride. These reactants were used in a mole ratio of at least about 8:1, respectively. The reactants and product were maintained under essentially anhydrous conditions while controlling the temperature at about −10° C. The resultant titanium tetraperchlorate had a purity of 97–98 percent. The conventional perchlorate method of analysis by precipitation as $KClO_4$ in alcohol was found to be hazardous, in one instance resulting in an explosion. Hence, analysis was made utilizing an aqueous method involving converting tetraphenyl arsonium chloride to the insoluble perchlorate. By this method, the following analysis of the product resulted:
*Analysis.*—Calcd. for $Ti(ClO_4)_4$: Ti, 10.75; $ClO_4$, 89.25. Found: Ti, 10.86; $ClO_4$, 86.4, 86.1.

The slightly low perchlorate value apparently resulted from slight moisture exposure during preparation.

A preliminary crystallographic study of $Ti(ClO_4)_4$ revealed that it is polymorphic. It can exist in at least three crystalline forms. Form I is a stable room temperature form which melts at approximately 90–94° C. without transformation, and may be recrystallized from the melt by seeding. Form II crystallizes slowly from the melt when supercooled to room temperature without seeding. It transforms to Form III enantiotropically at approximately 53° C. There is also evidence that it slowly transforms to the more stable Form I at room temperature. Form III exists between 53° and 86° C., where it melts. Visible signs of decomposition are noted in the melts above about 90° C.

Titanium tetraperchlorate can be stored for long periods of time without decomposition if kept under refrigeration in the absence of air and moisture. Dry Ice temperatures are particularly useful for this storage.

EXAMPLE II

*Anhydrous Beryllium Perchlorate*

Freshly sublimed beryllium chloride and anhydrous perchloric acid were reacted for several hours at −15° C. under essentially anhydrous conditions. The excess acid was removed by evacuation. A white, powdery product resulted. Analysis of this product showed that beryllium perchlorate had been obtained in 16 percent conversion.

Regulation of temperature during the synthesis of the above compounds is an important feature. For example, repetition of the procedure of Example II at temperatures ranging as high as about 50° C. gave rise to the formation of a high-viscosity glassy liquid from which no solid beryllium perchlorate could be isolated.

The above compounds are powerful oxidants, but appear to be relatively insensitive to physical shock and to thermal decomposition. Their strong oxidizing properties render them suitable for use as ignitors for propellants and other incendiaries. For example, when titanium tetraperchlorate was contacted with diethyl ether, the mixture exploded, whereas when contacted with formamide and dimethyl formamide under nitrogen the systems immediately burst into flame.

What is claimed is:

1. The process for preparing anhydrous titanium tetraperchlorate which comprises reacting anhydrous titanium tetrachloride with an excess of anhydrous perchloric acid at a temperature in the range of from −75° to +25° C., and separating anhydrous titanium tetraperchlorate from the reaction mixture.

2. The process for preparing anhydrous beryllium perchlorate which comprises reacting anhydrous beryllium chloride with an excess of anhydrous perchloric acid at a temperature in the range of from −75° to +25° C., and separating anhydrous beryllium perchlorate from the reaction mixture.

References Cited by the Examiner

Schumacher, Perchlorates, ACS Monograph Series (1960), pp. 39, 40, 55, 164.

MAURICE A. BRINDISI, *Primary Examiner.*

CARL D. QUARFORTH, *Examiner.*